United States Patent
Hlynka et al.

(10) Patent No.: US 7,327,112 B1
(45) Date of Patent: Feb. 5, 2008

(54) MULTIPLE LEG TUMBLING ROBOT

(76) Inventors: Adrian Gregory Hlynka, 29 West St. #1, Groton, MA (US) 01450; Christopher Gregory Hlynka, Box 357132, San Diego, CA (US) 92135-7132

( * ) Notice: Subject to any disclaimer, the term of this patent is extended or adjusted under 35 U.S.C. 154(b) by 61 days.

(21) Appl. No.: 11/369,071

(22) Filed: Mar. 6, 2006

(51) Int. Cl.
*B25J 5/00* (2006.01)

(52) U.S. Cl. .................................. 318/568.12
(58) Field of Classification Search ............ 318/568.12
See application file for complete search history.

(56) References Cited

U.S. PATENT DOCUMENTS

| | | | |
|---|---|---|---|
| 4,884,989 A | 12/1989 | Wong | |
| 5,040,626 A * | 8/1991 | Paynter | 180/8.1 |
| 5,121,805 A * | 6/1992 | Collie | 180/8.1 |
| 5,351,626 A | 10/1994 | Yanagisawa | |
| 5,445,235 A * | 8/1995 | Gomi et al. | 180/8.6 |
| 5,685,383 A * | 11/1997 | Ferrante | 180/8.6 |
| 5,701,713 A * | 12/1997 | Silver | 52/645 |
| 5,857,533 A * | 1/1999 | Clewett | 180/8.1 |
| 6,068,073 A * | 5/2000 | Roston et al. | 180/8.5 |
| 6,317,652 B1 | 11/2001 | Osada | |
| 6,414,457 B1 | 7/2002 | Agrawal et al. | |
| 6,481,513 B2 * | 11/2002 | Buehler et al. | 180/8.6 |
| 6,922,610 B2 * | 7/2005 | Okamoto et al. | 700/245 |
| 6,964,312 B2 | 11/2005 | Maggio | |
| 7,127,100 B2 * | 10/2006 | Wenzel et al. | 382/154 |
| 2002/0060267 A1 * | 5/2002 | Yavnai | 244/23 A |
| 2004/0207355 A1 * | 10/2004 | Jones et al. | 318/568.12 |
| 2005/0055131 A1 | 3/2005 | Mikami et al. | |
| 2005/0120820 A1 | 6/2005 | Takenaka et al. | |

* cited by examiner

*Primary Examiner*—Lincoln Donovan
*Assistant Examiner*—Antony Paul

(57) ABSTRACT

A robot or vehicle locomotes by tumbling. Legs distributed over the surface of the robot individually extend or retract. A control system coordinates the action of the legs to cause the robot to tumble in any direction. A robot using this form of locomotion is highly maneuverable, can climb slopes, and can step over obstacles. It can provide a smooth ride on rugged terrain. A variation can jump into the air and land safely. A variation can be built with as few as six moving parts, can fold to fit into a projectile, and instantly unfold on landing. It may use airbags instead of legs. It can include a video system without moving parts that produces a stable, non-tumbling view of its surroundings while tumbling. It is an ideal remotely operated vehicle for search and rescue, firefighting, or reconnaissance for the military or police.

6 Claims, 10 Drawing Sheets

MULTIPLE LEG TUMBLING ROBOT

CROSS-REFERENCE TO RELATED APPLICATIONS

None

FEDERALLY SPONSORED RESEARCH

Not Applicable

SEQUENCE LISTING OR PROGRAM

Not Applicable

BACKGROUND OF THE INVENTION

1. Field of the Invention

This invention generally relates to vehicle or robot locomotion, specifically to an improved and simplified system of using legs to propel a vehicle or robot.

2. Prior Art

Wheels, Legs, Obstacles, and Terrain

Human technology has had great success with vehicles on wheels. In practice wheeled vehicles need prepared roads because wheels do not perform well on terrain unless they are much larger than any irregularities of the terrain. For example, toy cars easily get stuck except on smooth, clean floors. Full-sized cars and trucks require a very expensive network of roads. Trains require smooth steel rails. Off-road vehicles typically have huge wheels to roll over irregularities, and still must proceed with careful attention to obstacles.

Tracked vehicles use continuous belts, usually of interlocking steel parts, rolling under wheels to improve the ability to roll over irregularities.

The Animal Kingdom makes use of legged locomotion in great variety, with many different numbers of legs, and different gaits. Legged locomotion can negotiate terrain with obstacles and irregularities almost as large as the length of the legs. Four legged animals in general and mountain goats in particular, easily negotiate large irregularities and step over obstacles.

Attempts have been made at mechanical walking, but there are few practical applications.

Complexity

In the prior art, technological attempts to mimic animal locomotion have been clumsy. Each leg on an animal typically has two or three joints (articulations) with one or two degrees of motion at each joint. Controlling these motions has proven difficult. Controlling them in such a way to overcome obstacles presents further difficulties. These issues are the subjects of the following U.S. patents.

| U.S. Pat. No. | Inventor | Year | Title |
|---|---|---|---|
| 6,481,513 | Buehler, et al. | 2002 | Single actuator per leg robotic hexapod |
| 6,317,652 | Osada | 2001 | Legged mobile robot |
| 5,838,130 | Ozawa | 1998 | Locomotion control system of legged mobile robot |
| 5,551,525 | Pack, et al. | 1996 | Climber robot |
| 5,351,626 | Yanagisawa | 1994 | Walking robot |
| 5,127,484 | Bares, et al. | 1992 | Orthogonal legged walking robot |

Balance vs. Complexity

Legged locomotion presents problems of balance, especially when the legs are few. With four, six, or more legs, balance is less of an issue because it is possible to have three feet on the ground at all times. However, controlling the many degrees of freedom becomes more of a problem.

Maintaining balance and negotiating terrain are the subjects of several patents.

These patents describe methods of balancing a bipedal robot.

| U.S. Pat. No. | Inventor | Year | Title |
|---|---|---|---|
| 6,959,776 | Furuta, et al. | 2005 | Bipedal humanoid |
| 5,459,659 | Takenaka | 1995 | Attitude stabilization control system for a legged mobile robot |
| 5,455,497 | Hirose, et al. | 1995 | Legged mobile robot and a system for controlling the same |

The following patent describes a six-legged robot.

| U.S. Pat. No. | Inventor | Year | Title |
|---|---|---|---|
| 5,040,626 | Paynter | 1991 | Walking robots having double acting fluid driven twistor pairs as combined joints and motors and method of locomotion |

Flipping Upside Down

Practically all vehicles (legged and wheeled) and animals get into difficulty if they become flipped on their side or upside down. They have to work to right themselves in order to resume their locomotion. Vehicles typically must get help from an external source, such as a tow truck. This is usually a slow and clumsy operation.

Static Stability

To avoid flipping over, animals dynamically adjust the positions of their legs. Their sense of balance induces them to get a good footing. Wheeled vehicles typically do not employ this option.

Some wheeled vehicles employ a hybrid solution. Mobile cranes often have outrigger legs that they extend when stationary to improve stability.

High Speed Operation

Wheels perform well at high speeds.

Legs, however, typically have inertia that must be overcome to move them into place for the next step. This requires energy, introduces complexity, and causes wear on any articulations.

Absorbing Shocks and Steering

Practical wheeled vehicles need a compliant suspension to isolate them from the shocks and vibrations from any remaining irregularities in the road or surface, especially at high speeds. The suspension is often complex, expensive, and is a main determinant of vehicle performance. The need to steer the wheels adds another level of complexity to the suspension.

The Animal Kingdom has an advantage here because a leg by its nature incorporates its own suspension. The normal operation of the leg allows for movement that can absorb shocks.

In addition, animals typically can jump, by moving their legs with sufficient speed and energy. Similarly, steering is efficiently accomplished by control of the gait.

The following patent deals with absorbing shocks.

| | | | |
|---|---|---|---|
| 5,445,235 | Gomi, et al. | 1995 | Legged mobile robot equipped with impact absorber |

Mechanical Walking

Because of the difficulties mentioned above, mechanical walking is seen almost exclusively in experimental settings, and in toys, where the clumsiness and complexity are tolerable.

Tumbling Robots and Vehicles

Some robots or vehicles are built entirely inside a large wheel or sphere. The vehicle traverses ground by rolling or tumbling. Such a wheel is much larger than if the vehicle had 4 wheels, and is correspondingly good at overcoming obstacles and irregularities.

A conceptually simple way to make such a vehicle is to enclose an ordinary wheeled vehicle inside a large sphere or cylinder. It drives on its own smooth interior surface and carries that surface with it. The motion of the mass of the internal vehicle induces the sphere to roll.

Any spherical rolling vehicle suffers from very limited driving torque because there is no external body from which to drive (and brake) the sphere. Driving must be accomplished by internally moving the center of mass. The torque is limited to what can be achieved by moving a mass internally. This is especially a problem when braking suddenly. Locking the inside components of vehicle against the interior of the wheel will simply cause it to rotate with the wheel.

A tumbling vehicle presents problems for applications that require a stable platform. It would be a poor choice to carry human passengers. Instruments such as cameras, sensors, manipulator arms, and weapons often require a stable platform, and so are problematical for a tumbling vehicle.

The following patents describe tumbling vehicles.

| | | | |
|---|---|---|---|
| 6,786,495 | Browning | 2004 | Tumbling toy |
| 6,414,457 | Agrawal, et al. | 2002 | Autonomous rolling robot |
| 5,575,702 | Silvious | 1996 | Telescoping tumbling toy |
| 4,884,989 | Wong | 1989 | Toy for tumbling down vertical surface |

OBJECTS AND ADVANTAGES

Accordingly, several objects and advantages of our invention are the following:

Physical Obstacles and Terrain

This invention allows a vehicle or robot to locomote or walk using support elements or legs of sufficient length to step over terrain irregularities or obstacles.

Alternatively, this invention allows a vehicle to use airbags to roll or bounce over obstacles.

A vehicle using this invention may include sensors on its legs to detect obstacles or terrain irregularities, to better step over such obstacles.

Complexity

This invention can use simple legs with only one degree of motion each. In fact, the complete vehicle can have as few as six moving parts. Accordingly, controlling the legs is correspondingly simple.

Balance vs. Complexity

A vehicle using this invention, even with a small number of legs, typically may keep three feet on the ground at all times. This makes it statically stable, so that a dynamic balancing system may not be needed.

Flipping Upside Down

A vehicle using this invention has no problem with being flipped over because that happens in normal operation. Its normal locomotion is to tumble or roll. It is ready to move from any orientation.

High Speed Operation

At high speeds, the legs of a vehicle using this invention move into place naturally. The motion of the legs remains simple at all speeds. In fact, the vehicle benefits from rotational inertia at speed to enhance its stability.

Smooth Operation

For a smooth ride the extension of the legs may be controlled to maintain the center of mass of the vehicle at a constant height above the terrain. This means that while tumbling, only the legs themselves are subject to shocks of contacting the ground. The rest of the vehicle experiences only simple rotation.

Absorbing Shocks and Jumping

The legs of a vehicle using this invention can absorb the impact of a fall or a landing in the course of their normal motion. The legs can be controlled to isolate the vehicle from vibration. No separate suspension parts are strictly needed.

Given a sufficiently strong power source, a vehicle using this invention can jump by simply executing its normal leg movement very rapidly. Similarly the vehicle may cushion its landing after a jump by vigorously resisting the compression of the legs.

If a vehicle using this invention uses airbags in place of legs, it will benefit from the well-known ability of airbags to absorb shock.

Steering

Because it has legs distributed all over its surface, a vehicle using this invention can tumble in any direction, and can change direction. Steering is achieved by controlling the extension of the legs.

In other words, the axis of rotation of the vehicle is not fixed. When the robot changes direction, the axis of rotation will change. In fact any imaginary axis that passes near the center of the vehicle can serve as the axis of rotation.

When a rotating body changes its axis of rotation, precession comes into play. The system that controls the extension of the legs may take into account the effects of precession.

Virtual Stability

A vehicle using this invention does not provide a physically stable platform while it tumbles. A human would not be comfortable riding it. But it can provide a virtually stable platform.

The vehicle could have multiple video cameras or other sensors arranged to provide a view of the entire surrounding space. An image-processing computer can synthesize a stable video feed from the tumbling platform by switching between the cameras and correcting for rotation. These operations are not difficult. Furthermore, many electronic and mechanical devices operate equally well in any orientation, and while tumbling.

This virtual stability makes this invention very appropriate for remotely or autonomously operated vehicles, which are now becoming more common and important in many applications.

SUMMARY

In accordance with this invention, a robot locomotes by tumbling. It propels itself and controls its speed and direction by controlling the extension and retraction of legs that are distributed over the surface of the robot.

Alternatively, airbags may be used in place of legs.

A robot using our invention can be built with as few as six moving parts. It can be made to fold to fit into a projectile and instantly unfold on landing. It can jump and land.

The tumbling robot may have video cameras connected to an image processor that corrects for the effects of tumbling to produce a stable view.

DRAWINGS

Figures

Figure 4:
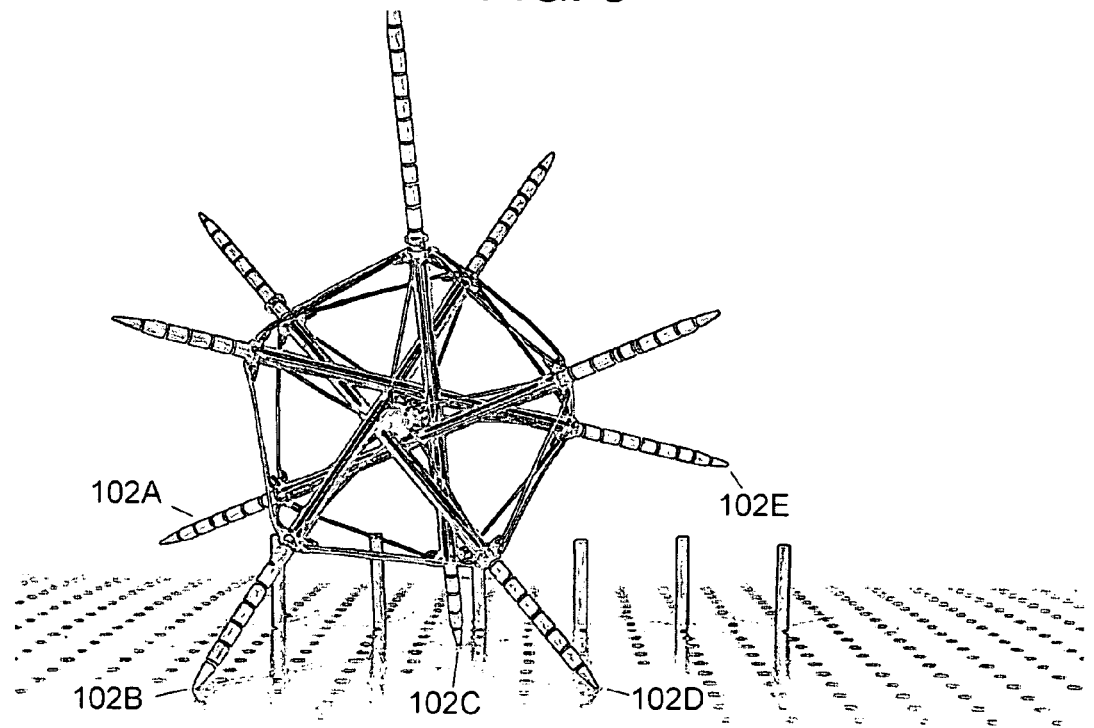

FIG. 4 as above, advanced in its tumbling motion.

Figure 5:
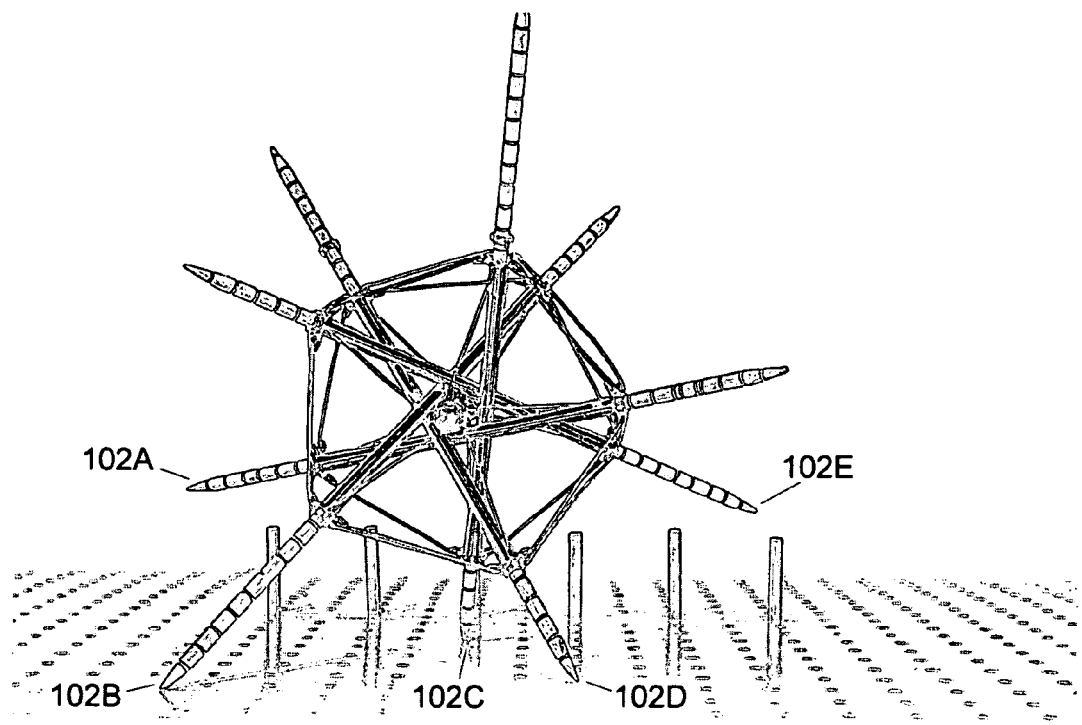

FIG. 5 as above, advanced further.

Figure 6:
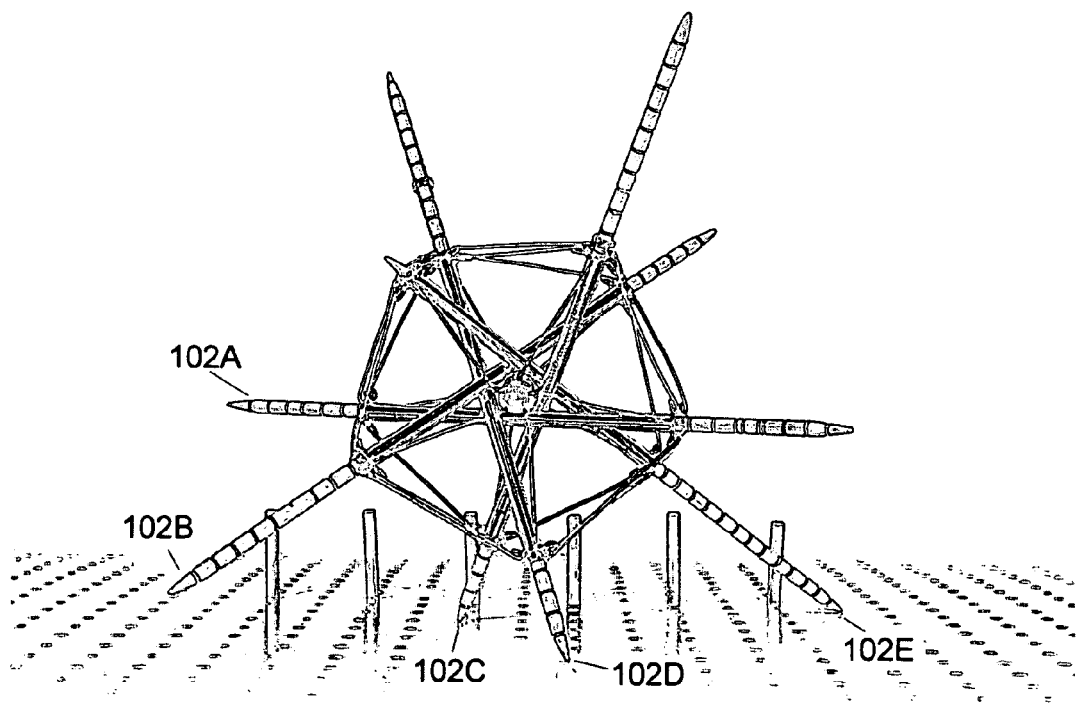

FIG. 6 as above, advanced further.

Figure 7:
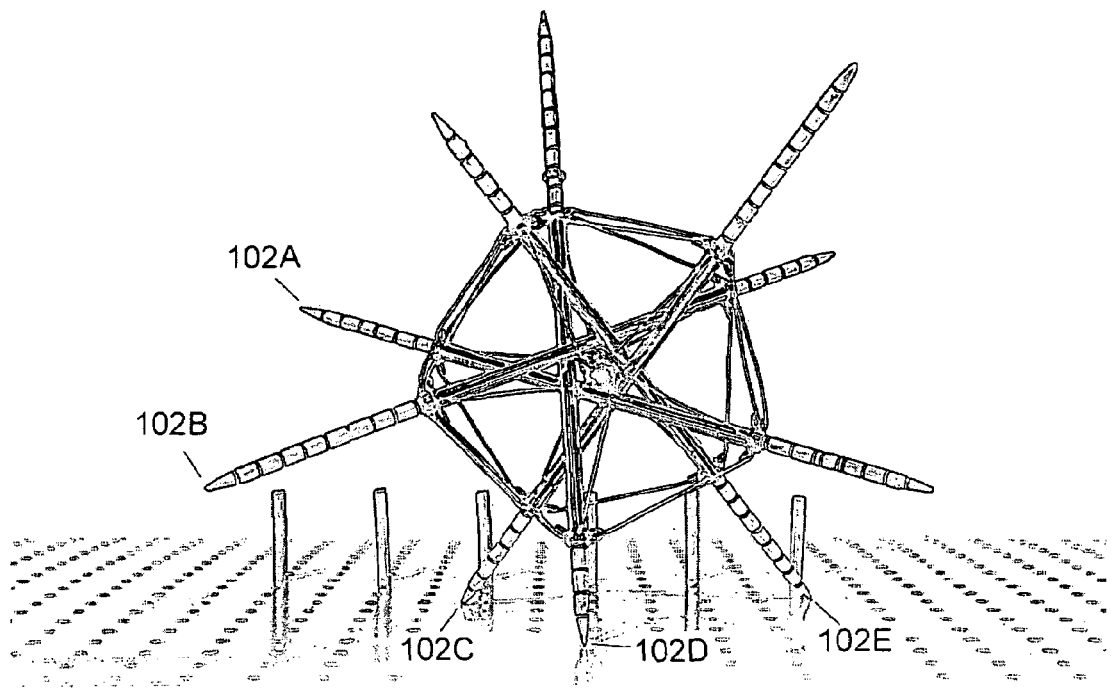

FIG. 7 as above, advanced further.

Figure 8:
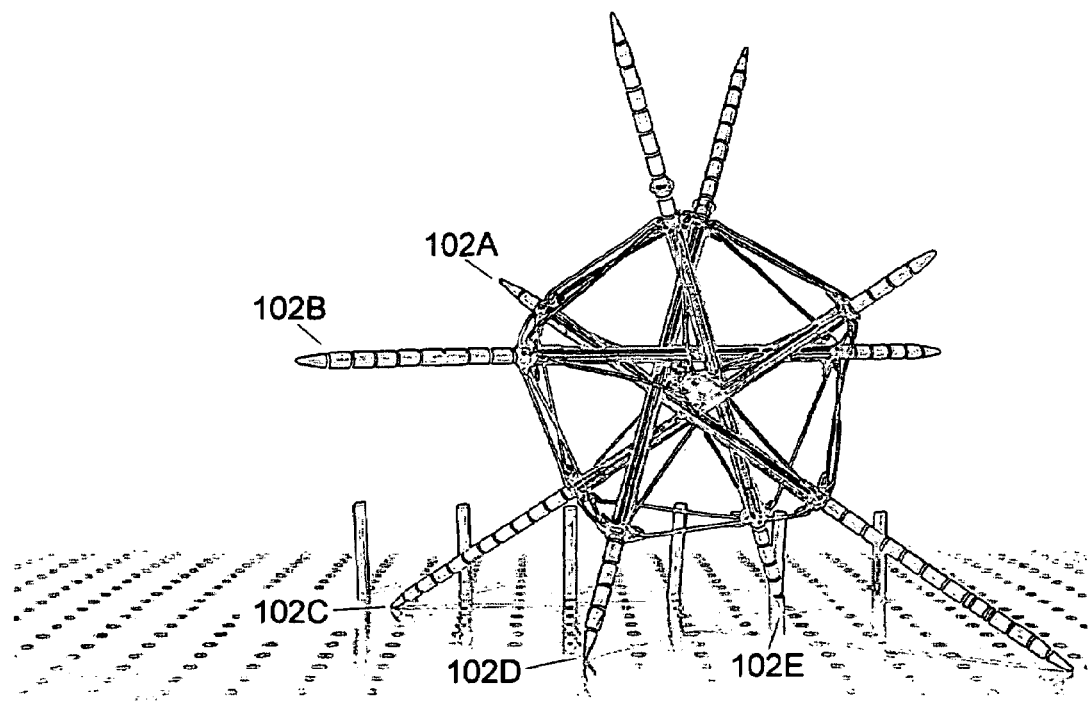

FIG. 8 as above, advanced further.

Figure 9:
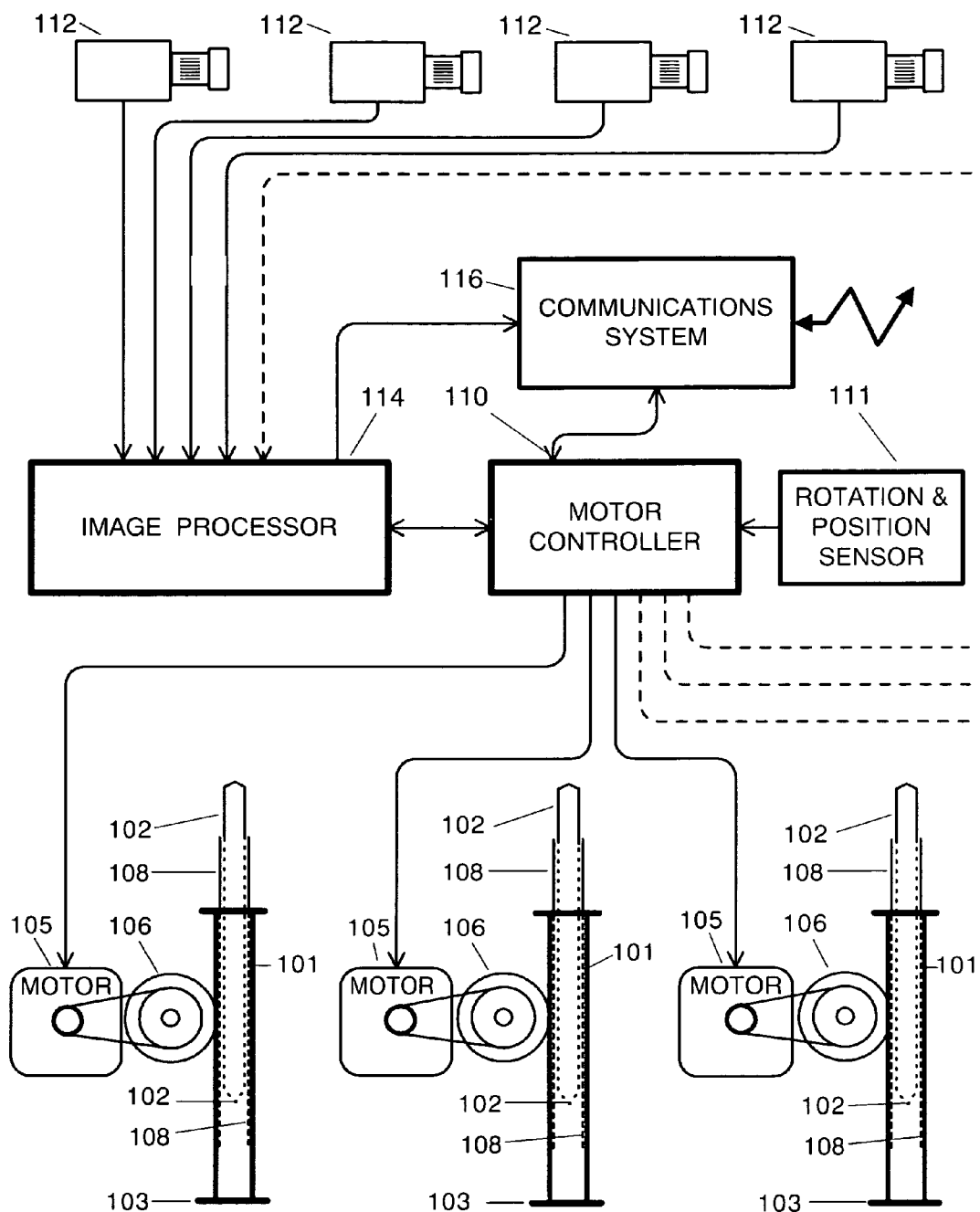

FIG. 9 is a schematic block diagram of the parts of the robot of the second preferred embodiment.

Figure 10:
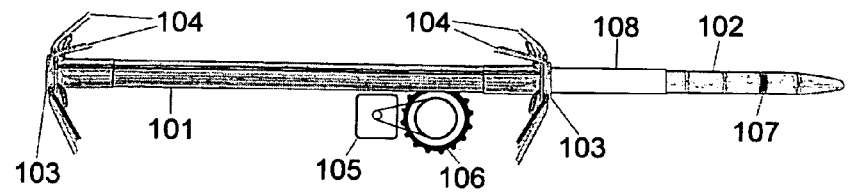

FIG. 10 is a detail showing one of the dual-acting legs of the robot of the second preferred embodiment.

Figure 11:
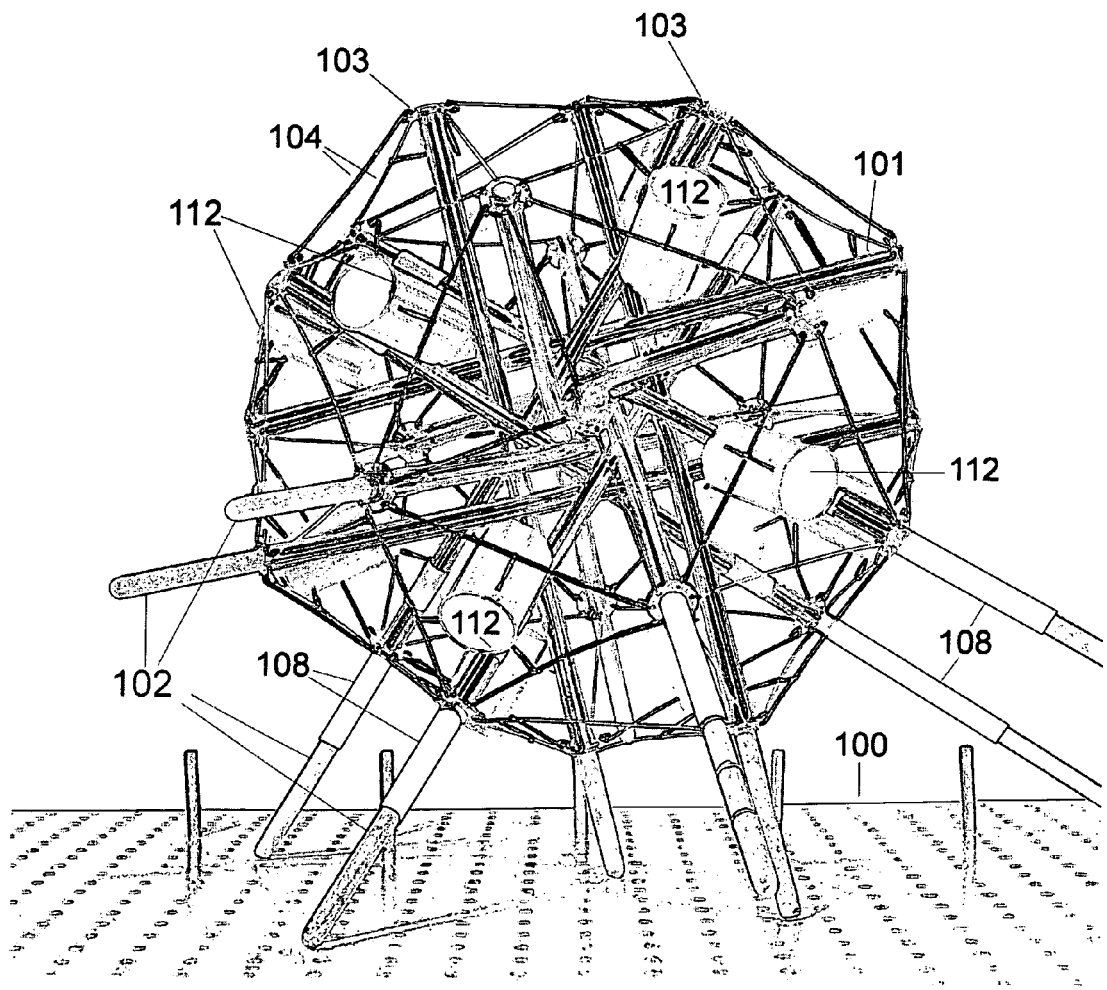

FIG. 11 is a perspective view of a complete robot as described in the second preferred embodiment.

Figure 12:
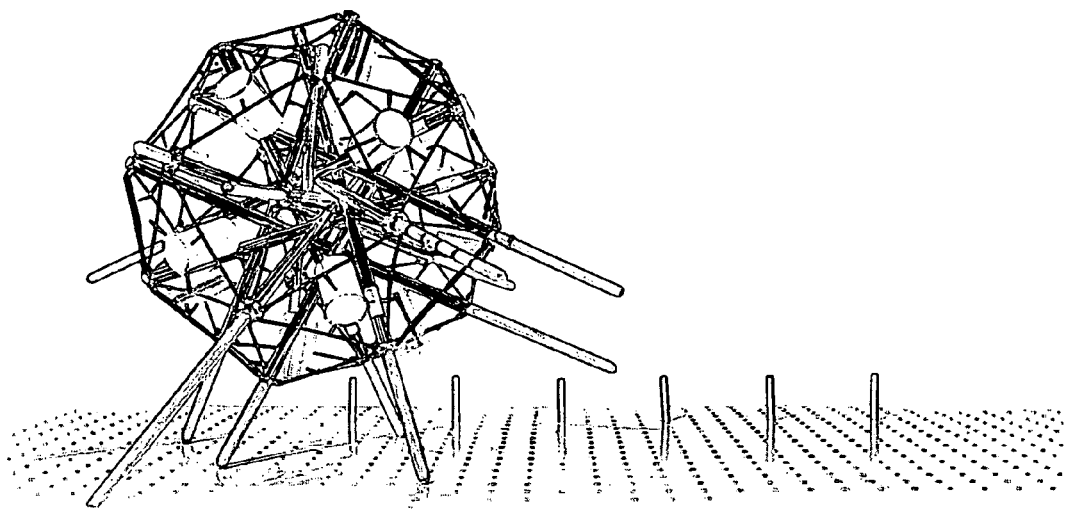

FIG. 12 is another perspective view of the robot of FIG. 11, showing its tumbling motion.

Figure 13:
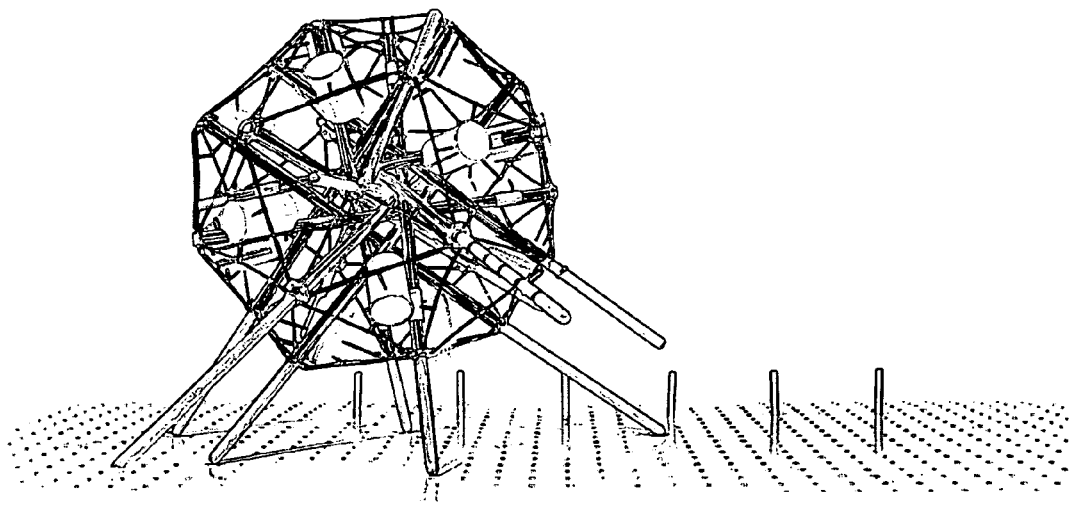

FIG. 13 as above, advanced in its tumbling motion.

Figure 14:
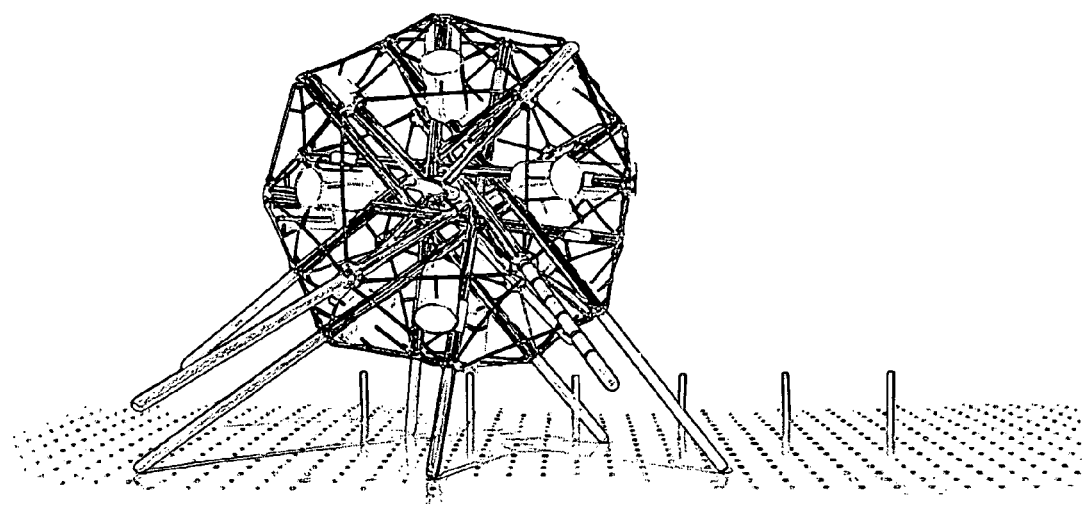

FIG. 14 as above, advanced further.

Figure 15:
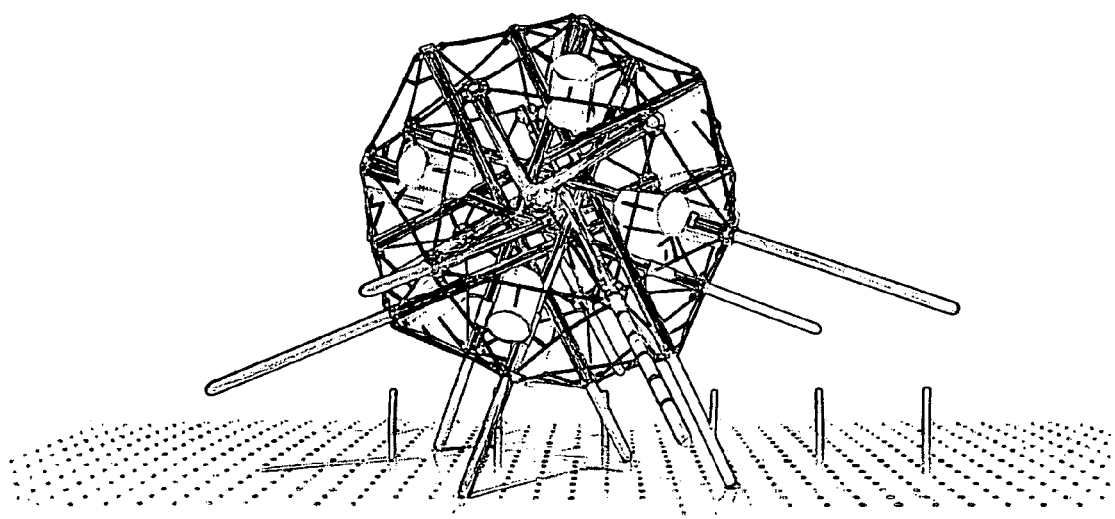

FIG. 15 as above, advanced further.

Figure 16:
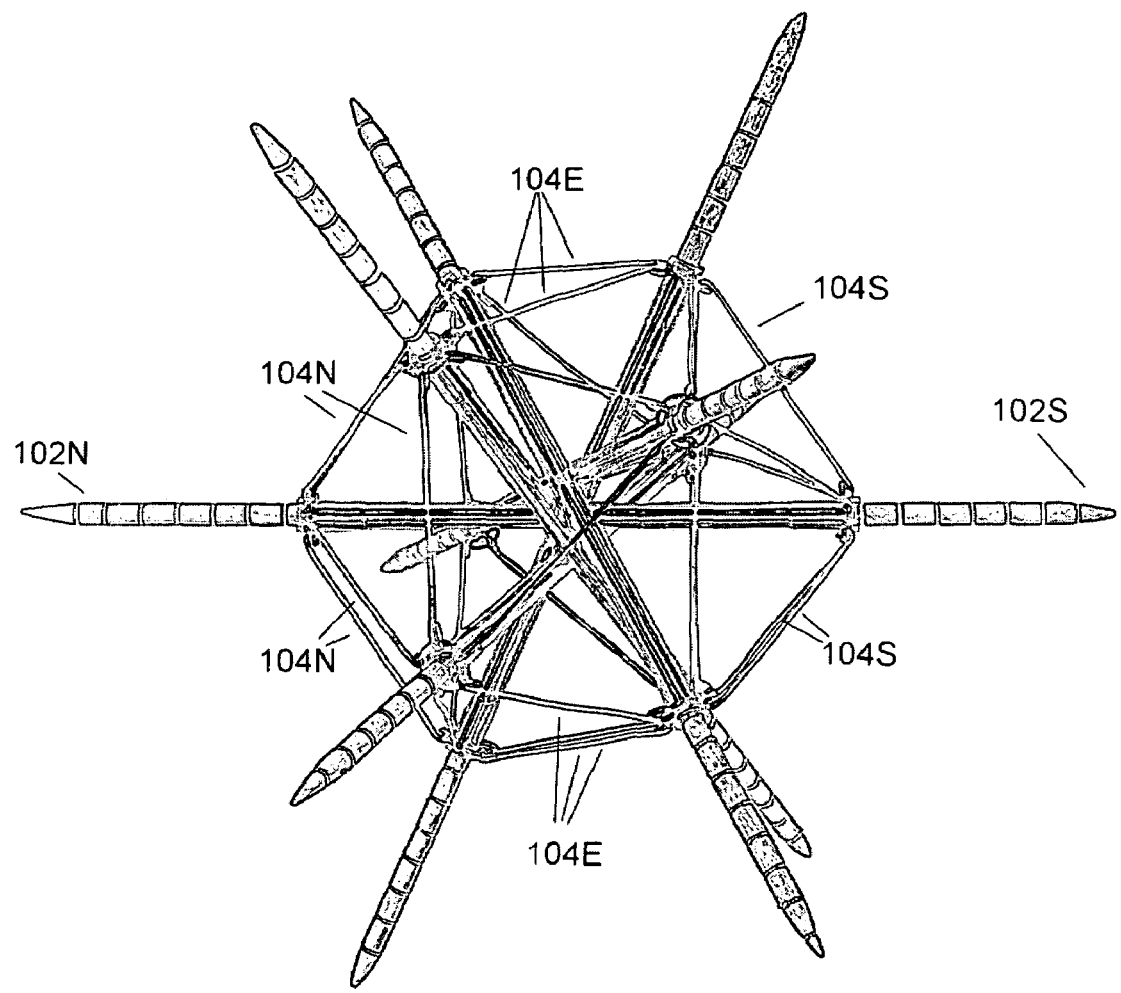

FIG. 16 is a perspective view of a complete robot as describe in the third preferred embodiment.

Figure 17:
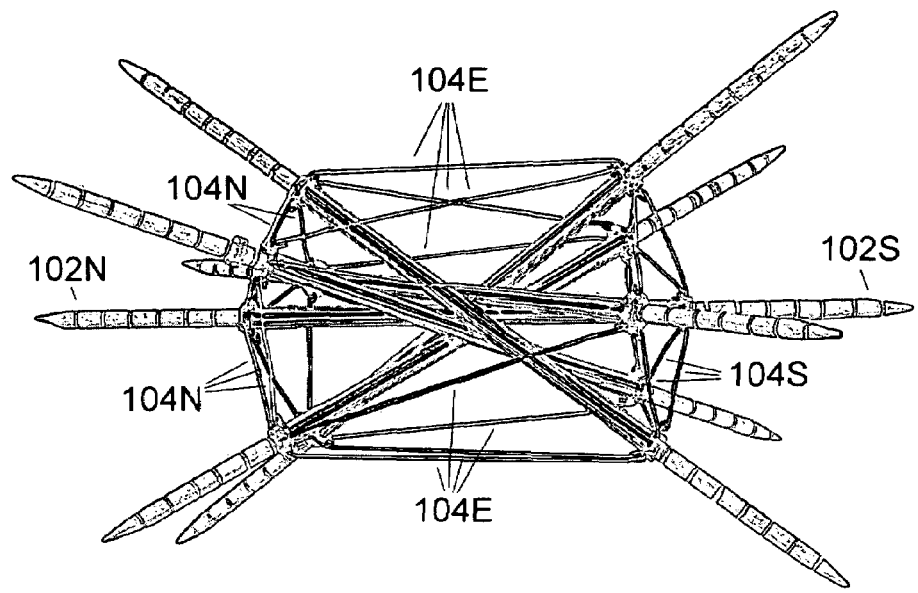

FIG. 17 is another perspective view of the robot of FIG. 16, in the process of folding up.

Figure 18:
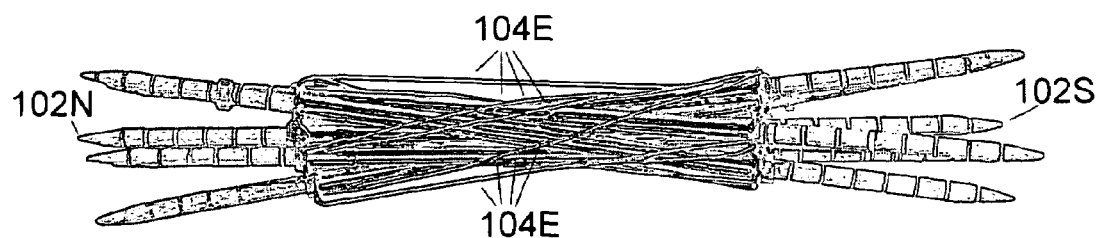

FIG. 18 is another perspective view of the robot of FIG. 16, in a compact, folded state.

DRAWINGS

List of Reference Numerals

| | | | |
|---|---|---|---|
| 100 | surface that robot will traverse | 101 | cylinder in which leg slides |
| 102 | sliding leg member | 103 | flange on cylinder |
| 104 | tension wire or cord | 105 | motor |
| 106 | actuator gear | 107 | compliant joint (optional) |
| 108 | sliding leg extender sleeve | 110 | motor controller |
| 111 | rotation/position sensor | 112 | video camera |
| 114 | image processor | 116 | communications system |

DETAILED DESCRIPTION

First Preferred Embodiment

FIGS. 1 through 8.

Background of the Design of the First Preferred Embodiment:

To tumble in any direction, from any orientation, our invention uses legs well distributed over its entire surface. The classic geometric figures known as Platonic solids serve as a guide to achieve this.

A Platonic solid is a three-dimensional geometric figure that has equal regular polygons as each face, and has the same number of faces meeting at every vertex. These solids achieve a perfectly symmetric distribution of vertices (corners) about a solid figure. There are only five Platonic solids; the tetrahedron, cube, octahedron, dodecahedron, and icosahedron. These have, respectively, four, six, eight, twelve, and twenty faces.

Accordingly, the first preferred embodiment of our invention is based on the icosahedron. An icosahedron has twenty identical equilateral triangles as faces. It has twelve vertices, each surrounded by five faces. Each leg corresponds to a vertex.

Figure 1:
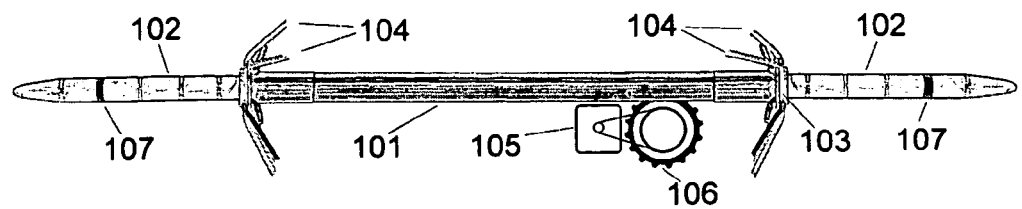
FIG. 1 is a detail showing one of the dual-acting legs of the robot of the first preferred embodiment.

Detail of the First Preferred Embodiment:

FIG. 1 shows a dual-acting leg assembly. Each leg assembly comprises a leg member 102 that slides within a cylinder 101. The leg is driven by an actuator gear 106 and motor 105, which are shown in simplified form without support structure. The leg member 102 has pointed ends to provide traction on the ground. There may be an optional compliant joint 107 near the end of each leg member 102, to serve as a passive articulation.

The sliding portion of the leg member 102 is approximately twice the length of the cylinder 101, and it may be extended from the cylinder in either direction by the length of the cylinder. Each cylinder end has a flange 103. Tension wires 104 attach the flange 103 to other similar flanges to assemble the robot. (See FIG. 2)

The actuator gear 106 and motor 105 serve to control the extension of the leg member 102. The motor 105 is connected to a power and control system (not shown) that operates all the motors of the robot. The details of the motor and actuator and their connection to the assembly are not shown. Any mechanical engineer could provide a design.

To reduce the number of moving parts, an electric solenoid could be employed instead of the motor and gear, so that the sliding leg 102 is the only moving part of the leg assembly.

When assembled in the robot, each dual-acting leg assembly forms two of the robot's legs, on opposite sides of the body of the robot.

Figure 2:
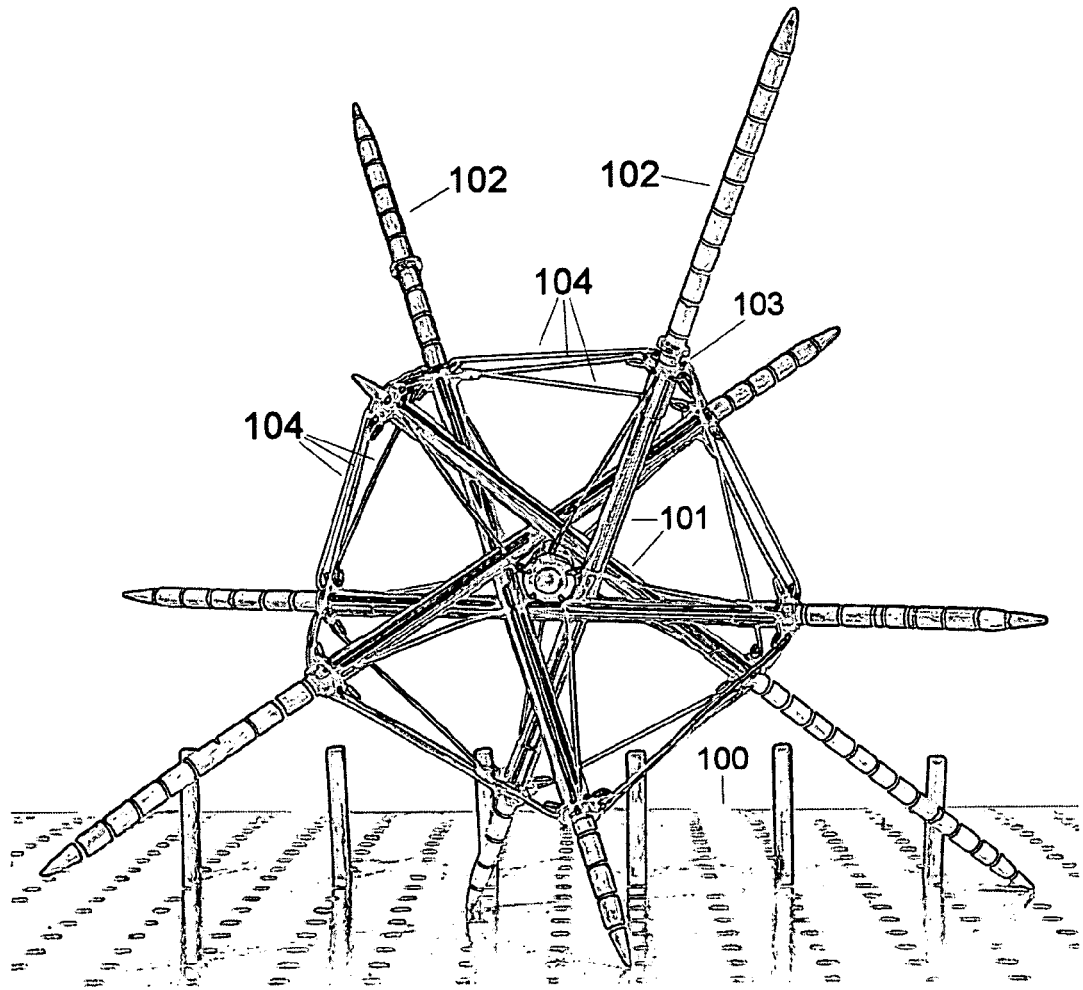
FIG. 2 is a perspective view of a complete robot as described in the first preferred embodiment.

FIG. 2 shows the first preferred embodiment of our invention. It is a complete robotic vehicle, comprising six dual-acting leg assemblies, each extending through the approximate center of the robot. In this preferred embodiment, six leg assemblies are arranged so their ends approximate the twelve vertices of an icosahedron. The only other components shown in FIG. 2 are thirty wire tension members 104 that attach the leg assembly flanges to each other. FIG. 2 omits the actuator motors and control system for clarity.

The leg members 102 serve as support elements for the body of the robot. In FIG. 2, three legs touch the ground surface 100, and a fourth leg almost touches the surface.

A perfect icosahedron would require every leg assembly to pass exactly through the center of the robot. This is obviously impossible, so in this embodiment, all but one leg assembly are offset from the center. FIG. 2 shows how the leg assemblies pass near the center, avoiding the one leg assembly that does pass through the center. FIG. 2 shows that central leg assembly perpendicular to the plane of the drawing. The exact arrangement is not critical.

These offsets distort the perfect symmetry of the icosahedron but do not materially affect the operation of the invention. This will become clear in the next section.

In this embodiment all the wires 104 are purely tension members. They can be simple flexible wires.

OPERATION

First Preferred Embodiment

Figure 3:
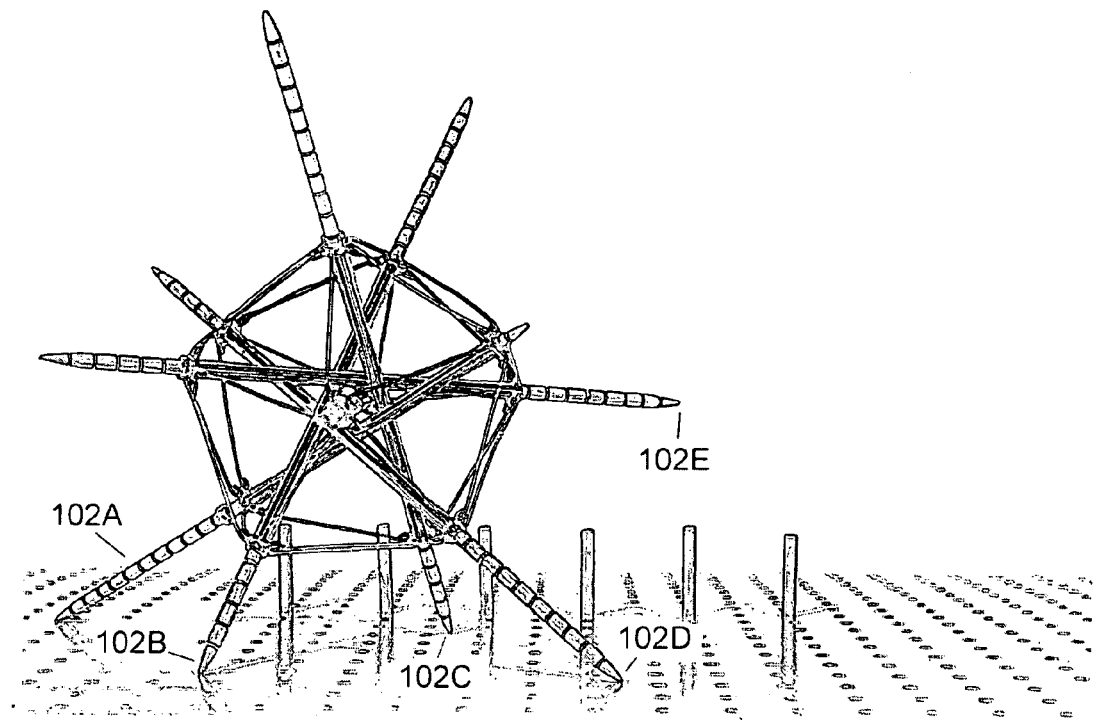
FIG. 3 is another perspective view of the robot of FIG. 2, showing its tumbling motion.

In this embodiment the robot is supported by three or four legs when stationary, regardless of its orientation. FIG. 3 shows the robot standing on legs 102A, 102B, 102C, and 102D, resting on a flat surface.

The motion of the legs is simply to extend and retract, radially from the approximate center of the robot. The robot in its entirety tumbles or rolls because of coordinated motion of the legs.

To start moving in an arbitrary direction, the one or two legs in the direction of the desired motion (of the three or four legs on the ground) are retracted, and the one or two trailing legs are extended. This starts the robot rolling.

FIG. 4 shows the robot of FIG. 3 slightly rotated. It shows leading legs 102C and 102D retracted, and trailing leg 102B extended, and leg 102A off the ground.

FIG. 5 shows continued tumbling motion; supported by legs 102B, 102C, and 102D.

FIG. 6 shows trailing leg 102B off the ground and leg 102E has touched the ground for the first time in a far leading position. This pattern continues in FIG. 7 and FIG. 8.

The cycle is simple. As the robot tumbles, the leading legs retract, pass under the robot, and become the trailing legs. Then they extend. Trailing legs rotate up out of the way and over the top. Eventually the legs roll into position as new leading legs and the cycle continues.

In this embodiment the extension of the legs is controlled so that the center of mass of the robot stays an equal height above the ground. This gives the robot as a whole a smooth ride.

The control computer computes the correct extension of each leg during tumbling. While tumbling in one direction on flat ground, this is a simple matter of computing geometric formulas, or reading values from a table. Adjustments are needed for steering and stopping. This robot has only six legs, each with just one degree of freedom, so at most six values need to be computed at any time. Actually, only three or four need to be computed because only three or four legs touch the ground at any time. The positions of the legs off the ground are immaterial.

In the case of obstacles, if their positions are estimated, the leg extension can be adjusted to step onto or over the obstacles. Alternatively or additionally, the legs may be equipped with force sensors to feel the positions of obstacles and extend appropriately. More work is needed in this area.

The tension wires that hold the robot in shape may have some limited elasticity, which helps absorb the shock of the legs contacting the ground at speed.

To stop, the robot resists retracting the leading legs, and stops extending the trailing legs. For a sudden stop it could extend the leading legs and perhaps retract the trailing legs.

To change direction, the robot increases the retraction of the legs leading the new desired direction and increases the extension of the legs trailing that direction. This will change the axis of rotation as well as the direction of travel. The axis of rotation does not in general correspond to the location of any leg assembly or any other structure on the robot.

DETAILED DESCRIPTION

Second Preferred Embodiment

FIGS. 9 through 15

The second preferred embodiment of our invention is a more complex variation of the first preferred embodiment, comprising more legs and including cameras.

It is a complete robotic vehicle, comprising thirteen dual-acting leg assemblies, each extending through the approximate center of the robot. The leg assemblies are slightly more complex, and the tension wires, actuators, and control system are similar to those of the first preferred embodiment.

The geometry is not based on any particular Platonic solid, but the twenty-six leg ends are nonetheless relatively evenly distributed over the surface of the robot.

FIG. 9 is a schematic block diagram that shows how the dual-acting leg assemblies are connected to a power supply and motor control device 110. FIG. 9 also includes a plurality of imaging devices or video cameras 112 connected to an image processor 114. FIG. 9 only shows three of the thirteen leg assemblies and four of the sixteen cameras. There is also a position and rotation sensor 111, connected to the control device 110. A communications system 116 connects the whole system to a remote operator (not shown) via bidirectional radio.

FIG. 10 shows a more advanced variation of the dual-acting leg assembly of FIG. 1. This assembly has a sliding leg member 102 approximately the same length as the cylinder 101 instead of twice the length. The leg member 102 slides in a sleeve 108, which in turn slides inside the cylinder 101. Thus instead of a simple sliding leg, this assembly implements a two stage telescoping leg.

FIG. 11 is a perspective view of the entire robot. It comprises thirteen leg assemblies as shown in FIG. 10. Each leg assembly has a flange 103. FIG. 11 shows the wire tension members 104 that attach the leg assembly flanges to each other.

FIG. 11 shows most of the legs that are not supporting the vehicle fully retracted, to avoid obstacles.

The exact dimensions and positions of the leg assemblies are not important. Even the number of them is not critical. They simply must be sufficient to support the robot in any orientation. The configuration of the robot of FIG. 11 clearly satisfies that requirement, but many other configurations would also.

FIG. 11 includes sixteen cameras 112 aimed outward, mounted where they do not interfere with the legs, and well distributed over the surface. Each camera has sufficient angle of view so that every point outside the robot is in view of at least one of the cameras. (There may be blind spots very near the robot.)

FIG. 11 omits the actuators, motors, control system, image processor, and other parts for clarity.

OPERATION

Second Preferred Embodiment

Compared to the first preferred embodiment, this vehicle is more complex and more capable. This vehicle moves based on the same principles as the first embodiment. This embodiment is meant to serve as a remotely controlled reconnaissance or surveillance robot.

FIG. 10 shows a fully retractable leg assembly. It is like the leg assembly of FIG. 1 except that the leg member 102 is short enough to fit within the cylinder 101. This allows the legs of this vehicle to be fully retracted when not supporting the vehicle. This is important because the retracted legs will not get in the way of possible overhead obstacles, an important advantage in areas of overhead vegetation or when navigating through damaged buildings.

In operation, the intermediate sliding sleeve 108 is extended from the cylinder 101 by half the distance that the leg member 102 is extended. This telescoping action allows this dual-acting leg assembly to extend nearly as far as the simpler leg assembly of FIG. 1. FIG. 10 does not show the details of the motor 105 and actuator 106 that achieve the required motion of the sleeve 108 and the leg 102. Any mechanical engineer would be able to provide designs for the actuator.

FIG. 12 shows the robot standing on five legs. FIGS. 12 through 15 show it tumbling to the right. As in the first preferred embodiment, the leading legs retract, and the trailing legs extend. Then the trailing legs rotate up out of the way, and new leading legs rotate onto the ground. Up to six legs are on the ground at any time.

After the trailing legs rotate off the ground, they retract to avoid overhead obstacles. Legs extend again just before they roll into position as new leading legs.

Compared to the first embodiment, the increased number of legs improves the ability to step over obstacles and allows it to climb steeper grades. If an obstacle gets in the way of one or two legs, there are likely to be enough remaining legs to achieve the desired motion.

For climbing steep grades the leg ends can be extended quite far from the center of mass of the robot.

As the robot walks, the geometry of the motion of the legs requires some of them to slip against the ground. This wastes energy and causes wear. Adding resilient feet or passive spring-loaded articulations at the ends of the legs can reduce this problem. FIG. 10 shows a passive articulation 107 near the end of the leg 102. Because they are passive, they do not increase the complexity of controlling the robot.

Video Image Stabilization

The sixteen video cameras 112 provide partially overlapping fields of view that together cover the entire space around the robot. As the robot tumbles, these video images naturally tumble as well. However, the image processor 114 shown in FIG. 9 takes the video signals and assembles a stable image by switching in the appropriate cameras and by computationally removing the rotation. The video system requires no moving parts, and so may be reliable and rugged.

The image processor 114 works as follows. Each standard video camera feeds the processor an electronic stream of image frames, conventionally thirty per second. While tumbling the cameras produce images that are rotated in successive frames, or that are translated in successive frames, or a combination of both. This image rotation and translation depends on the location of the camera relative to the current axis of rotation.

At the same time, the set of overlapping image frames from all the cameras taken at any one instant in time can view the entire space around the robot. To form a coherent large image, the edges of the images must be cropped and stitched together, and the overlaps discarded.

Cropping, stitching, rotating, and translating are all well-known digital imaging processes. The image processor applies these to remove the effects of tumbling and to form a coherent image.

The resulting processed video feed resembles the view from a single video camera from a stable moving vehicle, with pan and tilt capability. Front, side, and rear views can be seen simultaneously if desired. This is remarkably cheap and easy to do with today's video and computer technology.

The video can be used to determine the rotation of the robot, and could provide this information to the control system that drives the legs. This is appropriate when the visual (video) cues are good.

Conversely, the control system may provide its information about the motion of the robot to the image processor to assist it in removing the effects of tumbling. This is appropriate when the visual (video) cues are poor, for example, in darkness or smoke.

Lamps

Lamps may be mounted with the cameras to provide illumination for them. These lamps could be controlled by the image processor 114. Each would be turned on only when it was in place to light up the area of interest. This would conserve power if, for example, only the forward view were required.

Flashtubes, strobes, or other short-duration flash lamps could be a particularly effective means to help eliminate the effects of the tumbling motion. The image processor could control the timing of the flashes so that they only occurred in certain orientations. The stroboscopic effect would make the robot appear to not tumble.

Summary of the Second Preferred Embodiment

This embodiment makes a very capable, rugged, and effective surveillance and reconnaissance robot for fire fighting, search-and-rescue, and military operations. Exploring other planets, the ocean floor, or other hostile environments would be natural applications. It can negotiate rugged and steep terrain and return a stable video image while using relatively few moving parts.

DETAILED DESCRIPTION

Third Preferred Embodiment

FIGS. 16 through 18

FIG. 16 shows the third preferred embodiment of our invention. It is like the first preferred embodiment shown in FIG. 2, except that it can fold up into a compact cylinder. It is a complete robotic vehicle, comprising six dual-acting leg assemblies, each extending through the approximate center of the robot.

FIG. 16 is like FIG. 2 except that the central leg assembly extends left to right instead of perpendicular to the drawing.

The difference between the first and the third embodiments is that ten of the thirty tension wires that hold the robot in shape are replaced with elastic cords and the remaining twenty must be flexible but not stretch. (The wires in the first embodiment may already be flexible but not stretch, since they do not need to support compressive stress.)

To identify which wires need to stretch, start with the one leg assembly that goes through the exact center. Let its ends be called the north and south poles of the robot. FIG. 16 shows the corresponding leg ends as 102N and 102S, respectively. There are ten tension wires 104N in the north polar region and ten tension wires 104S in the south polar region. These twenty must be flexible but not stretch.

The remaining ten elastic tension cords 104E in the equatorial region must be able to stretch or extend.

OPERATION

Third Preferred Embodiment

The robot of FIG. 16 locomotes by tumbling in the same way as the first preferred embodiment.

To fold the robot of FIG. 16, one pulls the five leg ends surrounding the north pole towards that pole, and the five surrounding the south pole towards that pole. The ten equatorial cords stretch, and the polar wires either become loose or retract, depending on the exact design, as can be seen in FIGS. 17 and 18.

If the robot needs to fold itself, without outside influence, it incorporates a means to retract its north and south polar tension cables simultaneously. The ten equatorial tension cords stretch or extend in response. The ends of all the legs draw together at the poles, as can be seen in FIGS. 17 and 18.

FIG. 17 shows the same robot of FIG. 16 partially folded. The polar tension wires are partly retracted, which causes the equatorial cords to stretch.

FIG. 18 shows the fully folded configuration of the robot. The polar wires are fully retracted and the five legs are in a nearly parallel helix configuration surrounding the center leg.

In its folded state the robot can no longer tumble in a controlled fashion, but it is now compact enough to put in a aerodynamic cylinder and launched from a gun or in a rocket, or simply stored efficiently.

In most applications, the robot of FIGS. 16 through 18 would not need to fold itself, but would be stored already in its folded configuration. Thus no special folding mechanism is needed on the robot, just flexible wires and elastic cords.

Unfolding is simply the reverse of folding. Releasing the force that holds the leg ends together will allow the equatorial elastic cords to retract and unfold the robot instantly and reliably.

In flight, once the robot neared its target and its aerodynamic shape was no longer needed, the robot could unfold before landing. A parachute or airbag may be needed to cushion the landing.

Alternatively, the robot could remain folded until impact, and all six legs could act in parallel to absorb the shock of landing. The legs would be extended fully in the direction of flight. After landing it would quickly unfold and start normal tumbling.

FIGS. 16 through 18 do not show any control system, power supply, or sensors. In this embodiment these would have to be particularly compact and arranged to allow folding. Current technology trends are rapidly shrinking and improving all of these items, so this requirement should not be difficult to achieve.

CONCLUSIONS, RAMIFICATIONS, AND SCOPE OF INVENTION

Our invention provides a powerful means of locomotion and navigation for a wide variety of robots or vehicles. The envisioned sizes of these robots range from small enough to be mistaken for a large insect, to the size of a truck. The uses include search and rescue, surveillance, reconnaissance, and as weapons. Microscopic or nanotechnology variants might be possible.

While our above descriptions contain many specifics, these should not be construed as limitations on the scope of the invention, but rather as exemplifications of preferred embodiments. Many other variations are possible, some of which are described below.

Symmetric Icosahedron Variation with Fully Retracting Legs

One variation is an icosahedron-shaped robot with twelve single-acting leg assemblies located precisely at the vertices. This variation is similar to the first preferred embodiment, which uses six dual-acting leg assemblies to reduce the number of moving parts. These twelve leg assemblies would only extend to the center of the robot, so they would be only half the length of those in the first preferred embodiment. A telescoping mechanism might be needed to give adequate extension.

The true icosahedron variation has the advantages of perfect symmetry and that the legs not currently supporting the robot may be fully retracted out of the way. The symmetry would simplify the control system, and it might be more efficient than the compromised symmetry of the preferred embodiments.

Symmetric Dodecahedron Variation with Cameras

Similarly, another variation could have twenty single acting leg assemblies located at the vertices of a dodecahedron, with twelve video cameras on the centers of each face. This is a perfectly symmetric relative of the second preferred embodiment.

In addition to cameras, other sensor devices can be mounted. Possibilities include a GPS receiver, inertial guidance system, sonar, and infrared detectors.

Weaponized Variation

For military and police applications, guns or other aimed weapons could be mounted on the robot as well as sensors. The moving platform of the robot actually simplifies the mounting because no gimbals would be needed for aiming, thus reducing the number of moving parts. The legs could aim the whole vehicle. For enhanced stability when firing, all available legs could be extended, like the outriggers on a crane. Weapons that recoil could be mounted so their axes pass through the center of mass to reduce the reaction. A plurality of single-shot weapons might be particularly efficient and effective. The orientation of the robot would determine which weapon was ready for firing.

Laser target designators are another possibility. The robot would locate, identify, and designate or paint a target with a laser, and let a more powerful weapon make the attack.

As an example of a less lethal application, a robot could fire tear gas or an electric shock weapon selectively against a gunman holding hostages.

As mentioned earlier, given a strong enough power source, a robot using our invention can accelerate rapidly and even jump into the air. A compressed air or gas tank could provide bursts of power for jumping. Some of the energy could be recovered upon landing. The legs can actively cushion the landing after a jump or a fall.

Igniting gas or fuel in a cylinder could provide another strong power source for jumping. To save weight, as few as one of the legs could have the extra strong power source. The robot would have to maneuver so that strong leg was in position for jumping.

Putting many of these capabilities together, imagine a military or police scenario in which an enemy holds hostages in a building. A robot folded into a cylindrical projectile is fired through a closed window. It lands, unfolds instantly, and starts tumbling under remote control, feeding video images back to its operator. If necessary it jumps up stairs, onto tables, or into the face of the enemy. It identifies the enemy and attacks under the control of its operator.

Costs and Technology Trends

If the robot is destroyed or immobilized, a replacement may be launched. Modern technology should allow small robots using our invention to be built cheaply in quantity. Furthermore, both the sizes and the costs of the associated computer, video, telemetry, and remote control technology are decreasing.

Remotely operated vehicles (ROV's) are becoming very important and are an active area of development. So are autonomously operating vehicles (AOV's). Our invention is ideally suited to these applications.

A robot using our invention can be built with very few moving parts, which enhances durability. Since each leg is both a prime mover and suspension, and because replication of cameras and weapons may avoid the need to mechanically aim them, a useful vehicle can be built with as few as six (major) moving parts.

Unpowered, Coasting Variation

Another variation may have no onboard motive power source, to reduce cost, size, and weight. It would be launched at a target, perhaps already rolling, and its precise path could be controlled by selectively resisting the compression of the legs.

This is a ground-based analog of the weapon known colloquially as the smart bomb, which has an autonomous or remotely piloted flight control system for very precise targeting, but no on-board propulsion power source.

Because the entire mass of the robot tumbles, the rolling inertia of the robot is relatively large. This means the robot can climb inclines or bounce over obstacles that it otherwise could not. It also enhances the stability so that two or even one leg at a time is sufficient to support the robot in motion.

Swarm of Robots

In the past technology advances have concentrated on large, expensive, powerful devices, especially in the military. There is a new effort in the opposite direction to make use of small, simple, cheap, expendable devices in great quantity.

Our invention is very appropriate for this, because it may be realized with few moving parts, making good use of modern electronic technology.

In warfare, large quantities of small, smart, robots will be very useful. Many will remain even if many are destroyed.

The value goes beyond the military, however. In a firefighting scenario, for example, a large number of small, simple remote vehicles would be faster and more reliable than a single large one in exploring a building for survivors or for hazards to firefighters.

Variation to Clear Mines and Booby Traps

A small, simple, and cheap variation could have a rudimentary autonomous control system, perhaps no sensors at all, but a power source energetic enough to make it jump. To clear a building of booby traps, police or military would throw a group of these into the building where they would literally bounce off the walls and explore much of the volume of the rooms, setting off any bombs. Their positions might be monitored to make sure the volume of interest was explored.

Airbag Variation

A particularly robust and simple variation of our invention uses air bags instead of legs. The air bags can be positioned on the faces of an icosahedron or dodecahedron, for example, leaving spaces at the vertices for cameras. The inflation of the bags is analogous to the extension of the legs. They would be controlled in the same way and would drive the tumbling motion in a similar way. An air pump or tank, and valves replace the leg actuators.

This variation takes advantage of the well-known shock-absorbing ability of air bags. This variation has a simple fail-safe mode. In case of accident, including loss of control, or falling into unexpectedly rugged terrain, it may simply inflate all the airbags and wait to stop.

Microscopic or Nanotechnology Variation

Because it may be implemented with very few parts, our invention may be useful in very small or microscopic sizes. At small scales gravity and friction behave differently, so a tiny robot may work better using feet that stick to the surface using glue or some other microscopic phenomenon.

We claim:

1. A vehicle or robot comprising:
   (a) a body having a plurality of support elements of adjustable length or extension,
   (b) said support elements arranged on said body so as to support said vehicle or robot on a surface in substantially all possible orientations, and
   (c) a device for controlling the extension of each of said support elements individually so that the action of said support elements urges said vehicle or robot to tumble or roll cyclically over said surface over an extended distance over an arbitrary route, regardless of the initial orientation.

2. The vehicle or robot of claim 1 wherein said device for controlling the extension of each of said support elements maintains the center of mass of said body at an approximately constant elevation, or a gently changing elevation, so as to achieve smooth tumbling action, whereby smooth, efficient locomotion is achieved by a vehicle without a spherical or cylindrical shape.

3. The vehicle or robot of claim 1 wherein said support elements are arranged according to the vertices or faces of a Platonic solid, whereby symmetry and simplicity may be enhanced.

4. The vehicle or robot of claim 1 wherein said body, exclusive of said support elements, is formed by elongated members with ends connected by wires or cords in tension, wherein said wires or cords in tension have some elasticity, whereby shocks are absorbed, and whereby said body can be folded to fit into a narrow container, forcing some of said wires or cords to stretch or extend elastically in tension, storing energy, the release of which provides a quick and simple means of unfolding.

5. The vehicle or robot of claim 1 wherein said device for controlling the extension of each of said support elements absorbs energy, rather than providing power, whereby the direction and destination of an already tumbling vehicle may be precisely controlled, possibly without carrying a power source.

6. A method to provide a stabilized view from a tumbling vehicle, comprising:
   (a) providing a plurality of imaging devices or cameras, arranged on said tumbling vehicle so that together their fields of view cover substantially the entire solid angle around said tumbling vehicle,
   (b) providing an image processor that will:
      (1) receive inputs from said imaging devices or cameras,
      (2) integrate, merge, or stitch together the input images,
      (3) switch between said inputs as appropriate,
      (4) compensate for motion caused by tumbling, and
      (5) produce a stabilized image that provides a substantially constant direction of view;
   (c) providing a means of transmitting or recording said stabilized image,
      whereby said stabilized image can be seen by a human or autonomous operator and used to navigate said tumbling vehicle or to perform reconnaissance and said stabilized image can be achieved without using gimbals or other moving parts.

\* \* \* \* \*